K. SIEDOW.
SHOVEL OR SPADE ATTACHMENT.
APPLICATION FILED OCT. 16, 1913.
1,138,018.
Patented May 4, 1915.
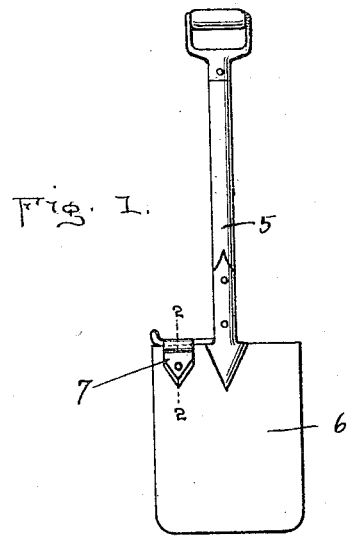
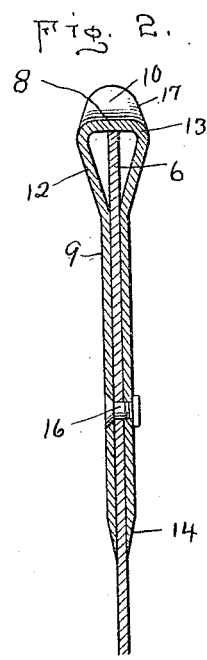
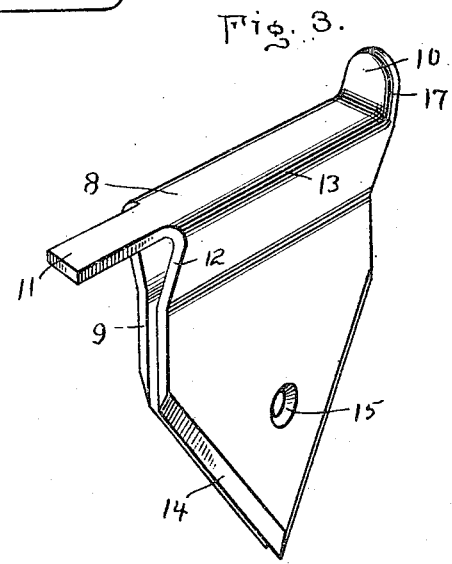

UNITED STATES PATENT OFFICE.

KARL SIEDOW, OF SIDNEY, NEBRASKA.

SHOVEL OR SPADE ATTACHMENT.

1,138,018.   Specification of Letters Patent.   Patented May 4, 1915.

Application filed October 16, 1913. Serial No. 795,541.

*To all whom it may concern:*

Be it known that I, the undersigned, KARL SIEDOW, citizen of the United States, residing at Sidney, in the county of Cheyenne and State of Nebraska, have invented certain new and useful Improvements in Shovel or Spade Attachments; and I do hereby declare the following to be a full, clear, and exact description of the invention, such as will enable others skilled in the art to which it appertains to make and use the same.

This invention relates to digging implements, and more particularly to a shovel or spade attachment.

One of the principal objects of the invention is to provide an attachment for a spade or shovel for affording a foot rest for the operator, and thereby eliminating the necessity of bending or flattening the upper edge of the blade of the instrument, which not only weakens the blade but has been known to cause the blade to split thus rendering the same unfit for use.

A further object of the invention is to provide a device of the class described, which will be simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawings, in which like characters of reference indicate like parts throughout the figures, of which, Figure 1 represents a front elevational view of a shovel, showing the attachment in place thereon, Fig. 2 represents a vertical transverse sectional view on the line 2—2 of Fig. 1, Fig. 3 represents a perspective view of the attachment removed from the shovel.

Referring more particularly to the drawing 5 indicates the handle, 6 the blade of a shovel, and 7 indicates the attachment secured to the upper edge of the blade on one side of the handle.

The attachment is preferably formed of a single piece of metal, and comprises a back 8 adapted to lie against the upper edge of a shovel blade, side plates 9 which are adapted to lie on opposite sides of the shovel blade, a lug 10 which is bent upwardly from one end of back 8 and which occurs near the outer end of the blade and which prevents the foot of the operator from slipping off the attachment, and an extended portion 11 of back 8 which lies beyond side plates 9 and which abuts against the lower end of handle 5. The lower portions of side plates 9 extend in parallel and contiguous relation, but the upper portions 12 thereof diverge upwardly and merge with back 8 as at 13 in spaced relation with the upper edge of the shovel blade, it being noted in this connection that the surface of the back 8 is much broader than the body of the shovel blade is thick, thereby affording a good foot rest, and it will be further noted that the upper portions 12 of the side plates brace back 8 and effectually prevent bending or displacement of the same with relation to the shovel blade, and since the portions 12 extend inwardly at an angle to the back, that should the foot of the operator slip forwardly, the heel of his shoe would be caught along the meeting edge of the back and one of the upper portions 12.

The lower edges of side plates 9 are V shaped and are beveled as at 14, to prevent collection of dirt along the edges of the plates, and said plates are provided with openings 15, whereby they may be secured to the blade by means of a bolt 16 which passes through the opening in the blade, or if preferred, by means of rivets, or other securing means. The points 13 at which the side plates merge with the back of the attachment are rounded as are also the inner edge of the lug 10 so that there will be no danger of the sole of the operator's shoe becoming scratched or cut. The extension 11 affords with the back portion 8 a broad bearing surface for the shoe of the operator, and at the same time helps to brace the attachment.

Although I have shown and described the attachment as applied to a shovel or spade, it will be understood that the attachment may be applied to various other instruments adapted for the same work, without departing from the spirit of the invention.

Although I have described the preferred embodiment of the invention, I may desire to make such changes in the construction, combination, and arrangement of parts thereof as do not depart from the spirit of the invention, and the scope of the appended claim.

Having thus fully described my invention, what I claim as new and desire to secure by Letters-Patent is,

An attachment for spades comprising a back wider than the top edge of the cutting blade of said spade, having an extension of the inner end adapted to fit snugly against the handle where it joins the cutting blade, and an upturned terminal at its outer end; front and back depending side plates bent obliquely to the plane of said back, to a point of contact with the surface of the said cutting blade, said depending side plates being then extended parallel to the front and back surfaces of said blade to closely embrace the same, said depending side plates having terminals with converging edges terminating in a point and said edges being beveled throughout their length.

In testimony whereof I have signed my name to this specification in the presence of two subscribing witnesses.

KARL SIEDOW.

Witnesses:
W. P. MILES,
BLONDIE McNEIL.

Copies of this patent may be obtained for five cents each, by addressing the "Commissioner of Patents, Washington, D. C."